United States Patent
McNarry et al.

(10) Patent No.: US 6,499,723 B1
(45) Date of Patent: *Dec. 31, 2002

(54) PORTABLE DETACHABLE SIDE MOUNTING LOAD STRAP ROTARY TENSIONING DEVICE

(75) Inventors: Daniel Gordon McNarry, Calgary (CA); Douglas Richard Skow, Calgary (CA); John Robert McNarry, Alexander (CA)

(73) Assignee: Y-Not Enterprises, Alberta (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 456 days.

(21) Appl. No.: 09/044,873

(22) Filed: Mar. 20, 1998

(51) Int. Cl.[7] ................................. B66D 1/00
(52) U.S. Cl. ................ 254/213; 24/71.1; 24/68 CD
(58) Field of Search ............... 254/213, 214, 254/215; 242/388.2, 388.3, 388.4; 24/71.1, 68 CD, 68 D; 410/103

(56) References Cited

U.S. PATENT DOCUMENTS

| | | | |
|---|---|---|---|
| 171,705 A | * 1/1876 | Taber et al. | 242/388.3 |
| 621,081 A | * 3/1899 | Hensley | 242/388.3 |
| 1,606,221 A | * 11/1926 | Hergesheimer | 242/388.2 |
| 2,389,777 A | * 11/1945 | Harris | 242/388.2 |
| 3,290,010 A | 12/1966 | Holmes | |
| 3,835,506 A | * 9/1974 | Berns | 24/68 D |
| 3,965,539 A | * 6/1976 | Golden | 242/388.4 |
| 4,227,286 A | 10/1980 | Holmberg | |
| 4,510,652 A | 4/1985 | Van Iperen | |
| 4,913,608 A | 4/1990 | Royball | |
| 5,026,230 A | 6/1991 | Dolezych et al. | |
| 5,426,827 A | * 6/1995 | Tracy et al. | 24/68 CD |
| 5,564,723 A | 10/1996 | Breeden et al. | |
| 5,611,520 A | 3/1997 | Soderstrom | |
| 5,915,547 A | * 6/1999 | Chen | 242/388.1 |

* cited by examiner

*Primary Examiner*—Kathy Matecki
(74) *Attorney, Agent, or Firm*—Birch, Stewart, Kolasch & Birch, LLP

(57) ABSTRACT

A portable detachable side mounting load strap rotary tensioning device 1 for mounting transversely on a load binding strap 2, the detachable portable side mounting load strap rotary tensioning device 1 comprising a frame 3 and, a rotary tensioning mechanism 4, and counter-rotation tabs 7 defining an opening, the rotary tensioning mechanism 4 located proximate one end of frame 3 and the counter-rotation tabs 7 located proximate the opposite end of frame 1, the rotary tesioning mechanism 4 comprising a rotating shaft 10 having a strap receiving slot 14, characterized in that the strap receiving slot 14 in the rotating shaft 10 and the opening between the counter-rotation tabs 7 are located for mounting traversely on a load binding strap 2.

4 Claims, 3 Drawing Sheets

PORTABLE DETACHABLE SIDE MOUNTING LOAD STRAP ROTARY TENSIONING DEVICE

FIELD OF THE INVENTION

This invention is in the field of tensioning devices for load binding straps. The invention is for a portable detachable side mounting load strap rotary tensioning device for tensioning a load binding strap extending over a load and attached to either side of a flat bed or other load support. More particularly this invention is for a portable detachable side mounting load strap rotary tensioning device used to increase the tension of a load binding strap which is already in tension.

BACKGROUND OF THE PRESENT INVENTION

A problem exists when a conventional fixed strap winch attached to one side of a flat bed is used to tension a load binding strap to the flat bed to restrain a load or object that is cylindrical, divisible or compressible. When one side of a load binding strap is fastened to one side of a flat bed and the free end of a load strap is placed over a load or object and then inserted into the industry standard fixed strap winch and tensioned, the load is pulled toward or tilted toward the side of the flat bed on which the fixed winch is mounted. This movement or tilting of the load can lead to a destabilizing effect on the load. For example, when the load is pulled towards the side of the flat bed to which the fixed winch is attached, a sharp turn in direction of the road on which the flat bed is being transported in the direction in which the load has moved or is tilted can lead to a further shifting of the load.

SUMMARY OF THE INVENTION

The portable detachable side mounting load strap rotary tensioning device of the invention is slid transversely over the side of a load binding strap opposite the end of the load binding strap extending through a conventional fixed winch located below a flat bed. Once the detachable side mounting load strap tensioning device is located on the load strap, tension is applied to the load binding strap on the anchor side of the flat bed to even tension pull on the cylindrical, divisible or compressible load, centering the cylindrical, divisible or compressible load on the flat bed.

DETAILED DESCRIPTION OF THE INVENTION

Figure 1:
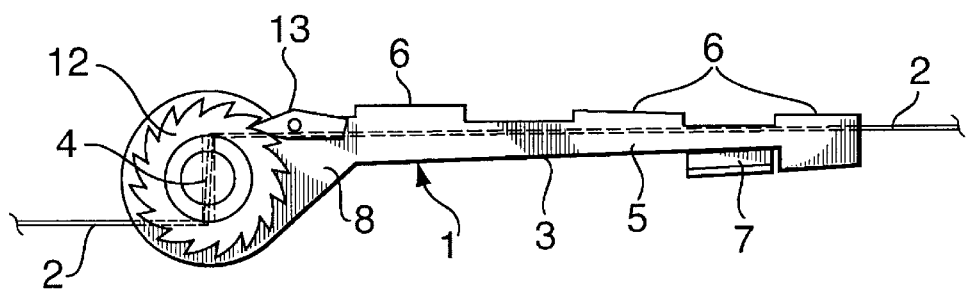
FIG. 1 is a side elevation view of the portable detachable side mounting load strap rotary tensioning device applied to a load binding strap.
Figure 2:
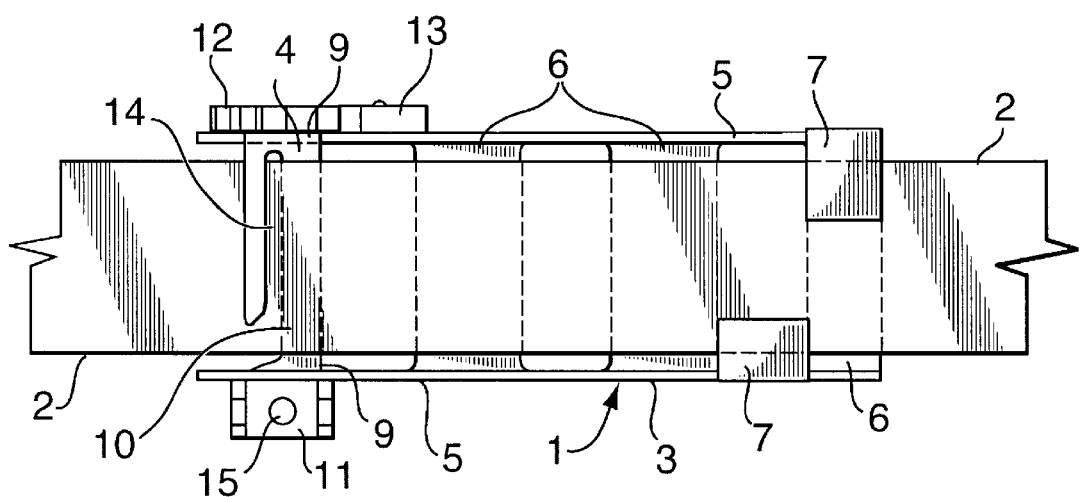
FIG. 2 is a bottom view of the portable detachable side mounting load strap rotary tensioning device applied to a load binding strap.

Referring to FIGS. 1 and 2 there is shown a portable detachable side mounting load strap rotary tensioning device 1 for use with a load binding strap 2. The portable detachable side mounting load strap rotary tension device 1 comprises a frame 3 and a rotary tensioning mechanism 4. The frame 3 is comprised of side walls 5, side wall horizontal supports 6 integrally connected to side walls 5 and counter rotation tabs 7 integrally connected to the edges of side walls 5 opposite side wall horizontal supports 6. Side wall horizontal supports 6 extend from side wall 5 to opposite side wall 5. As seen in FIG. 2, the counter rotation tabs 7 extend integrally inwardly from opposite side walls 5. The counter rotation tabs 7 are located towards the end of the frame 3 opposite the rotary tensioning mechanism 4. Counter rotation tabs 7 are integral with opposed side walls 5 extending horizontally inwardly towards the opposed side wall 5 for approximately one-eighth to one-third of the distance between opposed side walls 5. The counter rotation tabs 7 are offset from one another in the longitudinal direction of frame 3. The offset and gap between the counter rotation tabs 7 enables the frame 3 of detachable side mounting load strap rotary tensioning device 1 to be transversely applied onto a tensioned load binding strap 2.

As seen in FIG. 1, the upward extensions 8 of side walls 5 near one end of frame 3 have apertures therein defining oppositely disposed openings 9. The rotary shaft 10 of rotary tensioning mechanism 4 is supported by the openings 9 in the side walls 5. A collar 11 is integrally connected to one end of rotary shaft 10 and a locking wheel 12 is integrally connected to the other end of rotary shaft 10. The rotary shaft 10 includes a strap receiving slot 14. The strap receiving slot 14 is open in one direction for side mounting on a load binding strap 2. A pawl 13 is mounted on one of the side walls 5 so as to contact the locking wheel 12 of rotary tensioning mechanism 4. The collar 11 includes apertures defining openings 15 in the collar 11. The openings 15 in the collar 11 are transverse to the longitudinal axis of rotating shaft 11. The openings 15 are disposed at 180° relative to one another and are adapted to receive a rod to rotate rotating shaft 10.

As shown in FIGS. 1 and 2 the portable detachable side mounting load strap rotary tensioning device 1 is located on the load binding strap 2 such that the load binding strap 2 is located between the horizontal supports 6, side walls 5 and counter rotation tabs 7. The load strap receiving slot 14 which is open at one end is placed over and under the load binding strap 2.

Figure 3:
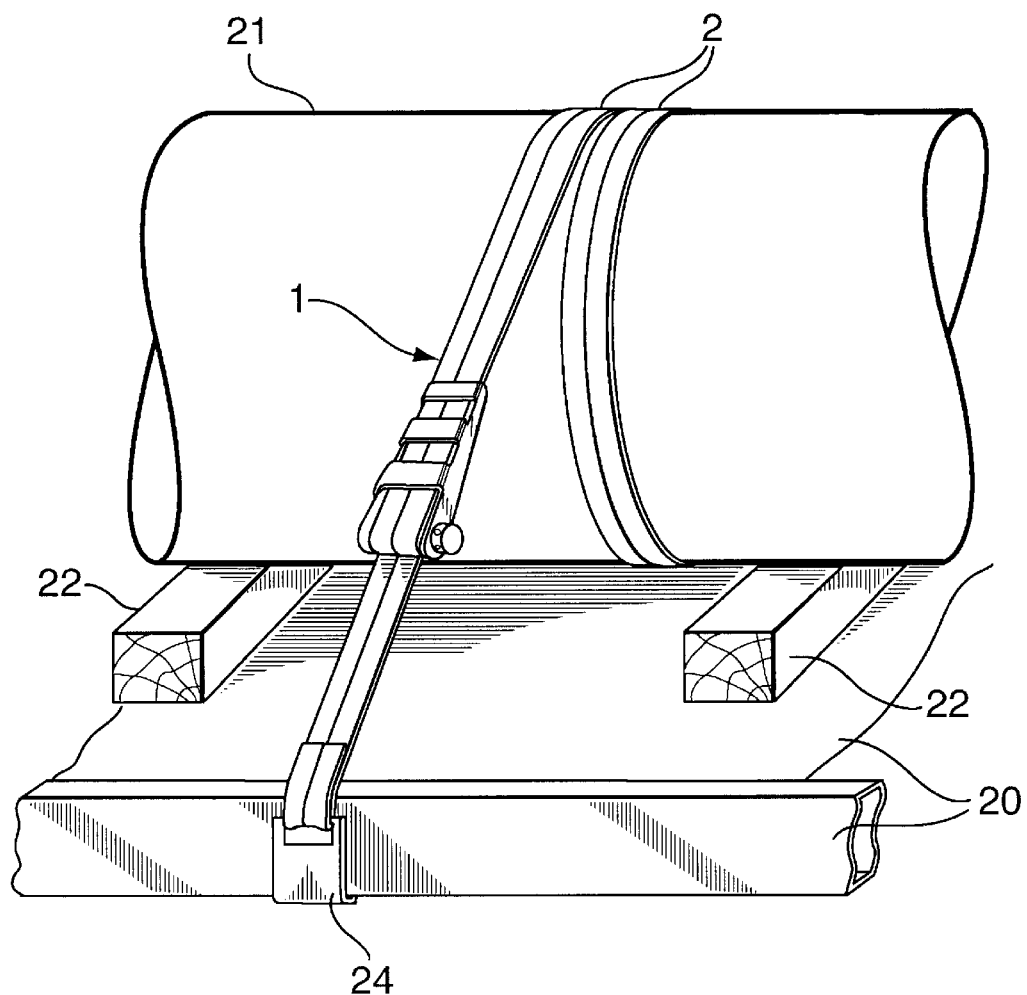
FIG. 3 is a perspective view of the portable detachable side mounting load strap tensioning device applied to a load strap fastened to one side of a flat bed wrapped around a cylindrical load and fastened by a conventional turning winch to the opposite side of the flat bed.

As seen in FIG. 3 a load strap 2 is fastened to one side of a flat bed 20 by a hook on anchor 24 and wrapped in a clockwise direction around a cylindrical load 21. The end of the load strap 2 is then threaded through a winch mounted on the flat bed 20 and partially tightened. The portable detachable side mounting load strap tensioning device 1 is then mounted transversely on the load strap 2 and partially tightened. Further tension is placed on the load strap 2 by further tightening the winch and subsequently further tightening the portable detachable side mounting load strap tensioning device 1 until the cylindrical load 21 is securely fastened to the flat bed 20.

Figure 5:
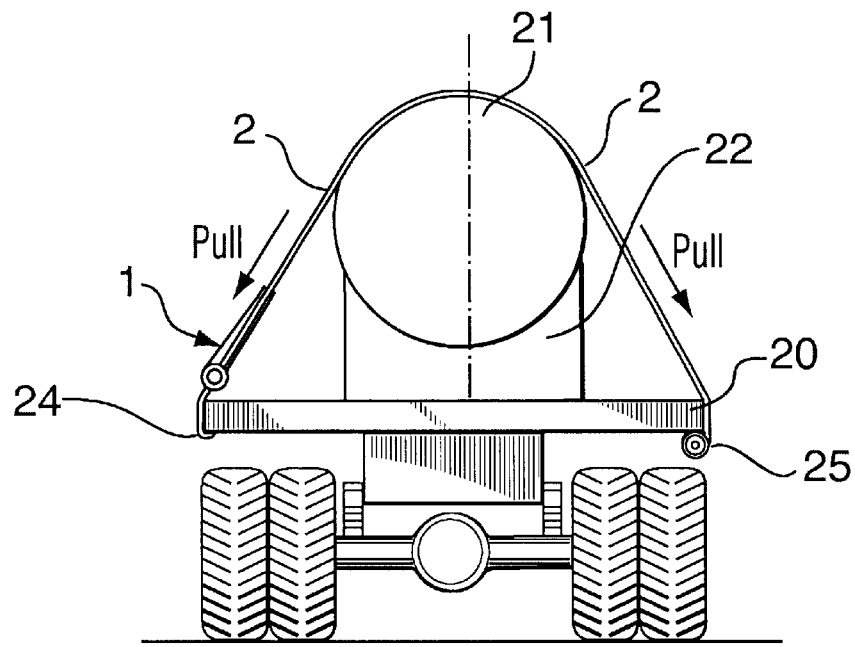
FIG. 5 is a rear view of the truck flat bed of FIG. 4 in which the portable detachable tensioning device of the invention has been side mounted on the tensioned load binding strap of FIG. 4 on the side opposite the conventional turning winch.

In operation as seen in FIG. 5 a load binding strap 2 is hooked to one side of a flat bed 20 by a hook on anchor 24. The load binding strap 2 is slung over the cylindrical load 21 resting on a support 22, threaded through a fixed winch 25 located below the opposite side of the flatbed 20. The fixed winch 25 is turned to tension the load binding strap 2. The portable detachable side mounting load strap rotary tensioning device 1 is slid transversely onto the load binding strap 2 on the side of the cylindrical load 21 opposite the fixed winch 25. As seen in FIGS. 1 and 2 the portable detachable side mounting load strap rotary tensioning device 1 is located on the load binding strap 2 such that the load binding strap 2 is located between the horizontal supports 6, side walls 5 and counter rotation tabs 7. The strap receiving slot 14 which is open at one end is placed over and under the load binding strap 2. With the portable detachable side mounting load strap rotary tensioning device 1 located on the load binding strap 2 a rod is placed through one of the openings 15 in collar 11. The rod is used to rotate collar 11, rotating shaft 10 and locking wheel 12 in a counter-clockwise direction applying further tension to load binding strap 2 pulling the cylindrical load 21 and support 22 in the direction of the portable detachable side mounting load strap rotary tensioning device 1. The tension applied to the load binding strap 2 by portable detachable side mounting load strap rotary tensioning device 1 is maintained by pawl 13 attached to one of sides 5 which engages locking wheel 12 integrally connected to one end of rotating shaft 10 of rotary tensioning mechanism 4. In order to release the tension on load binding strap 2, a rod is placed through one of the openings 15 in collar 11. The collar 11, rotating shaft 10 and locking wheel 12 are rotated in a counter-clockwise direction. The pawl 13 is removed from the loading wheel 12. The collar 11, rotating shaft 10 and locking wheel 12 are then turned in a clockwise direction removing tension applied by the portable detachable side mounting load strap rotary tension device 1. The portable detachable side mounting load strap rotary tensioning device can then be transversely removed from the load binding strap 2.

Figure 4:
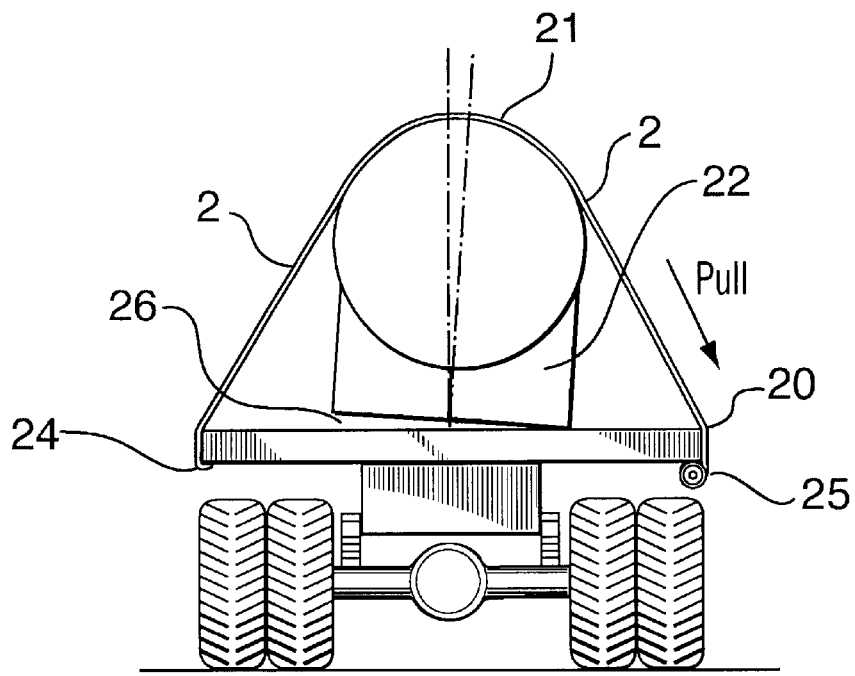
FIG. 4 is a rear view of a truck flat bed showing a load binding strap attached to an anchor on one side of the flat bed and extending over a circular load and through a conventional turning winch located below the flat bed on the opposite side of the flat bed.

As seen in FIGS. 4 and 5 the tension applied to the load binding strap 2 using the fixed winch 25 must be sufficient to tension the load binding strap 2 over on the cylindrical load 21 and support 22. On the other hand the tension applied to the load binding strap 2 by the fixed winch 25 must be such as to tension the load binding strap 2 but leave sufficient slack in load binding strap 2 that further tension can be applied to load binding strap 2 using detachable side mounting load strap rotary tensioning device 1. Tension can be applied to the load binding strap 2 sequentially using the fixed winch 25 and the portable detachable side mounting load strap tensioning device 1 as described done with respect to FIG. 3 to prevent the load from shifting or tilting excessively during application of tension to load binding strap 2.

Referring to FIG. 4 there is shown a flat bed 20 having a cylindrical load 21 resting on a support 22 located on the flat bed 20. The cylindrical load 21 and support 22 are secured to the flat bed 20 by a load binding strap 2. The load binding strap 2 is hooked to one side of the flat bed 20 by a hook or anchor 24. The load binding strap 2 is then placed over the top of cylindrical load 21 and threaded through a fixed winch 25 located below the opposite side of the flat bed 20. The load binding strap 2 is tensioned over the cylindrical load 21 by rotating the fixed winch 25. As seen in FIG. 1 the tensioning of binding strap 2 causes the cylindrical load 21 and support 22 to move in the direction of the fixed winch 25. This movement of the cylindrical load 21 and support 22 creates a gap 26 between one side of the bottom of support 22 and the top surface of the flat bed 20.

Referring to FIG. 5, the drawing shows all the elements described with respect to FIG. 4. The difference between the drawing of FIG. 5 and the drawing of FIG. 4 is that the portable detachable side mounting load strap rotary tesioning device 1 of this invention is placed about the load binding strap 2 on the side of the cylindrical load 21 opposite the fixed winch 25. After the fixed winch 25 has been rotated to tighten the binding strap 2 the detachable side mounting load strap rotary tensioning device 1 is rotated to pull the cylindrical load 21 and support 22 towards the portable detachable side mounting load strap rotary tensioning device 1. As seen in FIG. 5 after tensioning of load binding strap 2 using the portable detachable side mounting load strap rotary tensioning device 1, the base of the load support 21 sits on the top surface of the flat bed 20 removing the gap 26 shown in FIG. 4 between the base of load support 22 and the surface of the flat bed 20.

What is claimed is:

1. A portable detachable side mounting load strap rotary tensioning device (1) for mounting transversely on a load binding strap (2) under tension, comprising an elongated frame (3), and a rotary tensioning mechanism (4) at one end of said frame, the frame (3) comprised of side walls (5), side wall supports (6), and downward extensions (8) of said side walls (5) supporting said rotary tensioning mechanism (4), and said rotary tensioning mechanism (4) comprising a rotating shaft (10) having an axial load strap receiving slot (14) open at one end, characterized in that the axial load strap receiving slot is located for mounting transversely on the load binding strap (2), said slot extending parallel to and along substantially the length of the rotating shaft (10).

2. The load strap rotary tensioning device of claim 1 further comprising counter-rotation tabs (7) extending from said side walls (5) towards said opposite side walls (5) substantially parallel to said side wall supports (6).

3. A portable detachable side mounting load strap rotary tensioning device (1) for mounting on a load binding strap (2) under tension comprised of:

an elongated frame (3) and a rotary tensioning mechanism (4), said frame (3) being comprised of side walls (5), horizontal side wall supports (6), end of said frame (3), said downward extensions (8) of said side walls (5) having apertures therein defining oppositely disposed openings (9), said rotary tensioning mechanism (4) being comprised of a rotating shaft (10), collar (11), locking wheel (12) and an associated pawl (13), said rotating shaft (10) being mounted in said openings (9) located in said downward extensions (8) of said side walls (5), said rotating shaft (10) having an axial load strap receiving slot (14) open at one end, said slot extending parallel to and along substantially the length of said rotating shaft (10), said collar (11) being integrally connected to one end of said rotating shaft (10), one or more apertures defining openings (15) in said collar (11) extending through said collar (11) transversely to the longitudinal axis of said rotating shaft (10) and said integral collar (11), said locking wheel (12) being integrally connected to one end of said rotating shaft (10) opposite an end of said rotating shaft (10) connected to said collar (11), said pawl (13) being attached on said side wall (5) proximate the locking wheel (12), and one end of said pawl (13) being in contact with said locking wheel (12).

4. The load strap rotary tensioning device of claim 3 further comprising counter-rotation tabs (7) comprising inward perpendicular extensions of both said side walls (5) extending partially towards the other end of said side walls (5) parallel to said horizontal side wall supports.

* * * * *